United States Patent [19]

Smutny

[11] Patent Number: 4,962,184
[45] Date of Patent: Oct. 9, 1990

[54] POLYKETONE POLYMER USEFUL IN CHROMATOGRAPHY

[75] Inventor: Edgar J. Smutny, Houston, Tex.

[73] Assignee: Shell Oil Company, Houston, Tex.

[21] Appl. No.: 175,821

[22] Filed: Mar. 31, 1988

[51] Int. Cl.$^5$ .............................................. C08G 67/02
[52] U.S. Cl. .................. 528/392; 210/502.1; 210/656; 210/681; 210/687; 210/688; 210/692; 521/25; 528/496; 528/499
[58] Field of Search ............ 528/392, 496, 499; 210/502.1, 656; 521/25

[56] References Cited

U.S. PATENT DOCUMENTS

| 2,495,286 | 6/1949 | Brubaker | 260/63 |
| 3,694,412 | 9/1972 | Nozaki | 260/63 |
| 4,257,997 | 3/1981 | Soehngen | 264/145 |
| 4,290,987 | 9/1981 | Soehngen | 264/41 |

FOREIGN PATENT DOCUMENTS

| 0121965 | 10/1984 | European Pat. Off. |
| 0181014 | 5/1986 | European Pat. Off. |
| 1081304 | 8/1967 | United Kingdom |

Primary Examiner—Harold D. Anderson

[57] ABSTRACT

A material adapted for use as a stationary phase in chromatographic processes for adsorbing metal ions, comprising:
  a linear alternating polymer of carbon monoxide and at least one ethylenically unsaturated hydrocarbon.

5 Claims, No Drawings

POLYKETONE POLYMER USEFUL IN CHROMATOGRAPHY

BACKGROUND OF THE INVENTION

The present invention relates to polyketone polymers useful as the stationary phase in chromatographic processes for the adsorption of metal ions. It particularly relates to polyketone polymers which are linear alternating polyketone polymers. It has been discovered that certain linear alternating polymers of carbon monoxide and at least one ethylenically unsaturated hydrocarbon (polyketone), having appropriate surface area can be used to remove metal ions chromatographically from solution. A significant savings can be obtained in certain processes by scavenging scarce elements from solution, particularly for platinum group metals (PGM's), cobalt, chromium, manganese, antimony and others.

The class of polymers of carbon monoxide and olefins has been known for some time. Brubaker, U.S. Pat. No. 2,495,286, produced such polymers of relatively low carbon monoxide content in the presence of free radical initiators, e.g., peroxy compounds. U.K. No. 1,081,304 produced similar polymers of higher carbon monoxide content in the presence of alkylphosphine complexes of palladium salts as catalysts. Nozaki extended the process to produce linear alternating polymers by the use of arylphosphine complexes of palladium moieties and certain inert solvents. See for example, U.S. Pat. No. 3,964,412.

More recently, the class of linear alternating polymers of carbon monoxide and at least one ethylenically unsaturated hydrocarbon, e.g., polymers of carbon monoxide and ethylene or carbon monoxide, ethylene and propylene, has become of greater interest in part because of the greater availability of the polymers. The polymers, often referred to as polyketones or polyketone polymers, have been shown to be of the repeating formula —CO-(A)— where A is the moiety of unsaturated hydrocarbon polymerized through the ethylenic unsaturation. For example, when the polymer is ethylene the polymer is represented by the repeating formula —CO-(CH$_2$-CH$_2$)—. The general process for the more recent production is illustrated by a number of published European patent application Nos. including 0,121,965 and 0,181,014. The process generally involves the use of a catalyst composition formed from a compound of palladium, cobalt or nickel, the anion of a strong, non-hydrohalogenic acid, and a bidentate ligand of phosphorus, arsenic or antimony.

As used herein, the term "chromatographic processes" is used in a generic sense, referring to processes contacted with a stationary phase, comprising the novel polyketone material of this invention. Accordingly, while as will be described more fully hereinafter, the instant polyketone material possesses a mechanism for the adsorption of metal ions, particularly platinum group metals, within its scope of the invention, utility for other processes, well known to those skilled in the art may exist.

SUMMARY OF THE INVENTION

The present invention is a material adapted for use as the stationary phase in chromatographic processes for adsorbing metal ions comprising: a linear alternating polymer of carbon monoxide and at least one ethylenically unsaturated hydrocarbon. The present invention, can be achieved through the use of polyketone powder or pellets, comprising either polyketone copolymers or terpolymers. Features and advantages of the present invention, as well as the preferred modes of operation thereof, will become apparent to those skilled in the art from the following detailed description of the preferred embodiments.

DESCRIPTION OF THE PREFERRED EMBODIMENTS

The polyketone polymers which are employed herein are linear alternating polymers of carbon monoxide and at least one ethylenically unsaturated hydrocarbon. Suitable ethylenically unsaturated hydrocarbons for use as the precursors of the polyketone polymers have up to 20 carbon atoms inclusive, preferably up to 10 carbon atoms inclusive, and are aliphatic such as ethylene and other α-olefins including propylene, 1-butene, isobutylene, 1-hexene, 1-octene and 1-dodecene, or are arylaliphatic containing an aryl substituent on a carbon atom of an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-methylstyrene. Preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

The structure of the polyketone polymers is that of a linear alternating polymer of carbon monoxide and ethylenically unsaturated hydrocarbon and there will be within the polymer substantially one molecule of carbon monoxide for each molecule of hydrocarbon. When terpolymers are employed in the blends of the invention, there will be within the polymer chain at least two units incorporating a molecule of ethylene for each unit incorporating a molecule of the second hydrocarbon. Preferably there will be from about 10 units to about 100 units incorporating a molecule of ethylene for each unit incorporating a molecule of the second hydrocarbon. The polymer chain is therefore represented by the formula

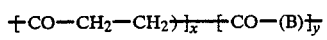

where B is the molecule of the second hydrocarbon of at least 3 carbon atoms polymerized through the ethylenic unsaturation. The

units and the —CO-(B)— units are found randomly throughout the polymer chain and the ratio of y:x is no more than 0.5. In the modification of the invention where a copolymer of carbon monoxide and ethylene is employed, there will be no second hydrocarbon in the polymer chain and such polymers are represented by the above formula wherein y = 0. When y is other than 0, i.e., terpolymers are employed, the ratio of y:x is preferably from about 0.01 to about 0.1. The end groups or "caps" of the polymer chain will depend on what materials are present during the production of the polymer and whether and how the polymer has been purified. The precise properties of the polymer will not depend on the end groups to any considerable extent so that the polymer is fairly represented by the above formula for the polymer chain.

Of particular interest are the polyketones of molecular weight from about 1,000 to about 500,000, especially those of molecular weight from about 10,000 to about 50,000. The physical properties of the polymer will depend in part on the molecular weight, whether the polymer is a copolymer or a terpolymer and the relative proportion of second hydrocarbon present in the case of terpolymers. Typical melting points are from about 175° C. to about 300° C., more typically from about 210° C. to about 270° C.

Useful polyketones have limiting viscosity numbers (LVN) as measured by the method wherein the polymer is dissolved in metacresol at 100° C. or dissolved in metacresol at 60° C. using a standard capillary viscosity measuring device, such as a Cannon-Ubbelohde viscometer. Polyketone polymers having LVN (60) in the range of 0.5 to 10 LVN are useful herein, though polyketones with LVN (60) of 0.8 to 4 and 0.8 to 2.5 are also usable herein. Hereinafter, where LVN is designated for a polyketone polymer, if the LVN was determined at 60° C., LVN (60) will be noted, if the LVN was determined at 100° C., LVN (100) will be noted.

A method of producing the polyketones which is now become conventional is to contact the carbon monoxide and hydrocarbon in the presence of a catalyst composition formed from a palladium compound, the anion of a non-hydrohalogenic acid having a pKa below about 6 and a bidentate ligand of phosphorus. The scope of the process for the production of polyketone polymers is extensive but, without wishing to be limited, a preferred palladium compound is a palladium carboxylate, especially palladium acetate, the preferred anion is the anion of trifluoroacetic acid is 1,3-bis(diphenylphosphino)propane or 1,3-bis[di(2-methoxyphenyl)phosphino]propane.

Polymerization is conducted in a gas phase in the substantial absence of reaction diluent or in a liquid phase in the presence of a reaction diluent such as a low alkanol, e.g., methanol or ethanol. The reactants are contacted under polymerization conditions in the presence of the catalyst composition by conventional methods such as shaking or stirring. Suitable reaction temperatures are from about 20° C. to about 150° C., preferably from about 50° C. to about 135° C. Typical reaction pressures are from about 1 bar to about 200 bar, more typically from about 10 bar to about 100 bar. Subsequent to reaction the polymer is recovered as by decantation or filtration. The polymer product may contain residues of the catalyst which are removed if desired by treatment with a solvent or extracting agent which is selective for the residues.

The polymer usable in the invention may also include conventional additives such as antioxidants, stabilizers, fillers, fire resistant materials, mold release agents and other substances which are added to increase the processability of the polymers or modify the properties of the polymer for use in chromatography. Such additives are added by conventional techniques.

Polyketone material usable in chromatography can be produced by dissolving polyketone polymer in a solvent, such as methanol. The slurry is filtered, such as through a screen, dried to remove traces of oxygen. The resulting powder is then passed through an extruder by Haake, or Baker-Perkins forming a strand. The strand is solidified in a water bath. Excess water is removed from the strand by drying. The strand is then pelletized and the pellets are dried, such as in a Hopper dryer or in a nitrogen atmosphere. The pellets can be cryoground into powder or used as pellets.

Test methods useful in measuring the foregoing properties of the instant polyketone material usable in chromatography for metal ions are well known to those skilled in the art, and are described in detail in U.S. Pat. Nos. 4,257,997 and 4,290,987, the entirety of which are hereby incorporated by reference and relied on in their entirety. The particular specific surface area measurement technique employed herein comprises a 3-point Nitrogen Adsorption Method developed by Brunauer, Emmett, and Teller (BET) using nitrogen as the adsorbent gas, and degassing with helium at a given temperature for a defined period of time, such as 4 hours to overnight using temperatures from 25° C. to 150° C.

The physical properties of a given batch of polyketone powder is a function of the specific procedures used in its preparation. Factors which may effect such properties could, include the LVN of the polyketone polymers and polymer, surface area of the polymers solvent used in preparation of the powder and/or pellets. Adjustment of these factors may be employed in order to obtain powder having the desired adsorbent characteristics.

It is particularly advantageous to use powders with surface areas of 15 to 500 $m^2/g$ as determined by the BET 3 Point Nitrogen Adsorption Method, discussed in the Examples which follow.

The invention is illustrated in connection with the following Examples, which are to be considered as illustrative of the present invention. It should be understood, however, that the invention is not limited to the specific details of the Examples.

EXAMPLE I

Polymer 1

A linear alternating polymer of carbon monoxide and ethylene 055/028 was produced in the presence of a catalyst composition formed from palladium acetate, the anion of trifluoroacetic acid and 1,3-bis(diphenylphosphino)propane. The melting point of the copolymer was 257° C. and the polymer had a LVN (100) of 1.10 when measured in m-cresol and 0.3 wt % of Irganox 1076 was added to the polymer as a stabilizer. Polymer 1 showed surface area values of 32-53 $m^2/g$ using the 3 Point Nitrogen Adsorption Method of BET. More specifically, using high vacuum and 25° C. overnight the BET calculated surface area was an average of 53 $m^2/g$. Using high vacuum and 100° C. for 4 hours an average of 51 $m^2/g$ surface area was determined. Using high vacuum, 150° C. for 4 hours, a 32-35 $m^2/g$ average surface area was determined.

Polymer 2

A linear alternating polymer of carbon monoxide and ethylene 056/001 was produced in the presence of a catalyst composition formed from palladium acetate, the anion of trifluoroacetic acid and 1,3-bis(diphenylphosphino)propane. The melting point of the copolymer was 257° C. and the polymer had a LVN (100) of 2.0 when measured in m-cresol.

EXAMPLE II

Using polymer 1 described in Example I and a high activity solvent, (water), comparison was made to a low activity adsorbent, Celite (manufactured by J. T. Baker and which is essentially a diatomaceous earth), using the same high activity solvent (water) in a test for palladium adsorbency.

In a chromatography column, a 4 gram charge of adsorbent was disposed above a glass wool plug. An amount of distilled water was added sufficient to cover the plug and adsorbent. 5 mls of 1% $Na_2PdCl_4$ (yellow in color) which analyzed as 1700 ppm Na and 3800 ppm Pd, was added to the column. 50 mls of distilled water was then introduced to the column. The results follow in Table 1.

TABLE I

| SAMPLE | WT* | Na(ppm) | Pd(ppm) |
|---|---|---|---|
| CELITE (4 grams) | | | |
| 1 | 2.6 | 11 | 3.1 |
| 2 | 9.8 | 700 | 1600 |
| 3 | 9.6 | 100 | 1500 |
| 4 | 5.9 | 12 | <1 |
| POLYKETONE POLYMER 1 (4 grams) | | | |
| 5 | 3.4 | <5 | <1 |
| 6 | 9.7 | 30 | 12 |
| 7 | 11.2 | 590 | 1000 |
| 8 | 9.9 | 100 | 330 |

*wt % represents the collected fraction after elution through the column.

EXAMPLE III

Using polymer 1 described in Example 1, and water as a solvent, comparisons were made to Celite using water in a test for palladium adsorbency.

In a chromatography column, a 4 gram charge of adsorbent was placed over a glass wool plug in a chromatography column. Distilled water was added to the column in an amount to cover the adsorbent and the plug. 50 mls of 1% $Na_2PdCl_4$ was added to the column. This 1% solution of $Na_2PdCl_4$ which analyzed as 1700 ppm Na, 3800 ppm Pd. The results follow in Table II.

TABLE II

| SAMPLE | WT | Na(ppm) | Pd(ppm) |
|---|---|---|---|
| CELITE (4 grams) | | | |
| 9 | 9.65 | 18 | 18 |
| 10 | 8.99 | 1500 | 2600 |
| 11 | 9.62 | 1700 | 2600 |
| 12 | 9.12 | 1700 | 2900 |
| 13 | 3.83 | 1700 | 2800 |
| POLYKETONE POLYMER 1 (4 grams) | | | |
| 14 | 9.73 | 3.2 | <1 |
| 15 | 9.80 | 280 | 188 |
| 16 | 9.87 | 1600 | 2300 |
| 17 | 9.85 | 1700 | 2800 |
| 18 | 2.38 | 1700 | 2600 |

EXAMPLE IV

Using polymer 2 described in Example 1, and water as a solvent, test was made for palladium adsorbency.

In a chromatography column, a 15 gram charge of adsorbent was placed in a glass wool plug in a chromatography column. Distilled water was added to the column in an amount to cover the adsorbent and the plug. 5 mls of 1% $Na_2PdCl_4$ was added to the column. This 1% solution of $Na_2PdCl_4$ which analyzed as 1700 ppm of Na, 3800 ppm Pd.

The results follow in Table III.

TABLE III

| SAMPLE | WT | Na(ppm) | Pd(ppm) |
|---|---|---|---|
| POLYKETONE POLYMER 2 (15 grams) | | | |
| 19 | 4.83 | <5 | <1 |
| 20 | 4.85 | 320 | 210 |
| 21 | 5.00 | 1000 | 1700 |
| 22 | 5.44 | 280 | 870 |
| 23 | 4.95 | 51 | 320 |
| 24 | 5.71 | 24 | 140 |
| 25 | 4.80 | 15 | 44 |
| 26 | 4.91 | 10 | 24 |
| 27 | 2.51 | 12 | 16 |

As a result of these tests, the polyketone copolymers are particularly advantageous as adsorbents for the platinum group metals. It is expected that these polymers have good adsorbency for the metals of the Periodic Table, Pt, Ru, Rh, Pd, Os, Ir, Cr, Co, Mn, Sb, Ag, and Au. It is expected that other metal ions, such as Na, and Ca should also be adsorbed by the novel polymer. It is expected that metal ions having a valence of more than 2 (i.e., polyvalent systems) will be adsorbed by the unique polyketone polymers.

It is expected that other high activity solvents besides water will be usable herein.

It is contemplated that the novel polymer powders could be produced in pellet or bead form and be usable within the scope of the present invention.

The polyketone polymer containing the desired metals could be burned to isolate the desired metal.

The principles, preferred embodiments and modes of operation of the present invention have been described in the foregoing specification. The invention which is intended to be protected herein, however, is not to be construed as limited to the particular forms disclosed since those are to be regarded as illustrative rather than restrictive. Variations and changes may be made by those skilled in the art without departing from the spirit of the invention.

What is claimed:

1. A material suitable for use as a stationary phase in chromatographic processes for adsorbing metal ions selected from the group consisting of chromium, manganese, silver, gold, sodium and calcium, comprising: a polymerized linear alternating polymer prepared from carbon monoxide and at least one ethlenically unsaturated hydrocarbon.

2. The material of claim 1, wherein said linear alternating polymer is of the formula

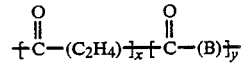

wherein B is the moiety of an ethylenically unsaturated α-olefin of at least 3 carbon atoms polymerized through the ethylenic unsaturation, the ratio of y:x is no more than about 0.5.

3. The material of claim 1, wherein said linear alternating polymer is of the formula

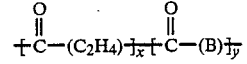

wherein B is the moiety of an ethylenically unsaturated α-olefin of at least 3 carbon atoms polymerized through the ethylenic unsaturation, and wherein group B of said linear alternating polymer is propylene, and the ratio of y:x is from about 0.01 to about 0.2.

4. The material of claim 2, wherein said linear alternating polymer comprises a second ethylenically unsaturated hydrocarbon.

5. The material of claim 2, where y is zero.

* * * * *